United States Patent [19]
Nakamura

[11] 3,710,239
[45] Jan. 9, 1973

[54] HIGHLY SENSITIVE FAULT LOCALIZATION APPARATUS CAPABLE OF LOCATING MULTIPLE FAULTS ALONG A SECTION OF AN ELECTRIC POWER TRANSMISSION LINE

[75] Inventor: Takeshi Nakamura, Tokyo-to, Japan

[73] Assignee: Tokyo Shibaura Electric Company, Ltd., Kawasaki-shi, Japan

[22] Filed: April 2, 1971

[21] Appl. No.: 130,710

[30] Foreign Application Priority Data

April 8, 1970 Japan.................................45/29558

[52] U.S. Cl...............................324/52, 179/175.3
[51] Int. Cl. .............................................G01r 31/08
[58] Field of Search .....................324/52; 199/175.3

[56] References Cited

UNITED STATES PATENTS

| | | | |
|---|---|---|---|
| 2,717,992 | 9/1955 | Weintraub | 324/52 X |
| 2,794,071 | 5/1957 | Hughes et al. | 324/52 X |
| 3,462,681 | 8/1969 | Biskup | 324/52 |
| 3,470,331 | 9/1969 | Barash et al. | 324/52 X |
| 3,609,533 | 9/1971 | Pardis | 324/52 |

Primary Examiner—Gerard R. Strecker
Attorney—Oblon, Fisher & Spivak

[57] ABSTRACT

A surge receiving type fault localizer includes a plurality of counter devices respectively disposed in different stages at one end of a section of an electric power transmission line to be inspected. The starting operation of the counter devices is controlled according to a predetermined sequence every time a surge is received by a counter control device disposed in the corresponding stages. A signal wave receiving device having outputs connected to the corresponding counter devices is provided for stopping a counting operation every time a signal is received from the other end of the section. Thus, the counter devices operate cyclically in turn every time a surge is received and the most recent content of the counter devices is read out by the operation of a relay device which is provided for protecting the section from an internal fault.

8 Claims, 6 Drawing Figures

HIGHLY SENSITIVE FAULT LOCALIZATION APPARATUS CAPABLE OF LOCATING MULTIPLE FAULTS ALONG A SECTION OF AN ELECTRIC POWER TRANSMISSION LINE

BACKGROUND OF THE INVENTION

1. Field of the Invention

The present invention generally relates to a fault localization apparatus for an electric power transmission line, and more particularly to a fault finder for detecting a fault point on an electric power transmission line by receiving an electric surge from the fault point at the ends of a section of the transmission line to be inspected.

2. Description of the Prior Art

Figure 1:
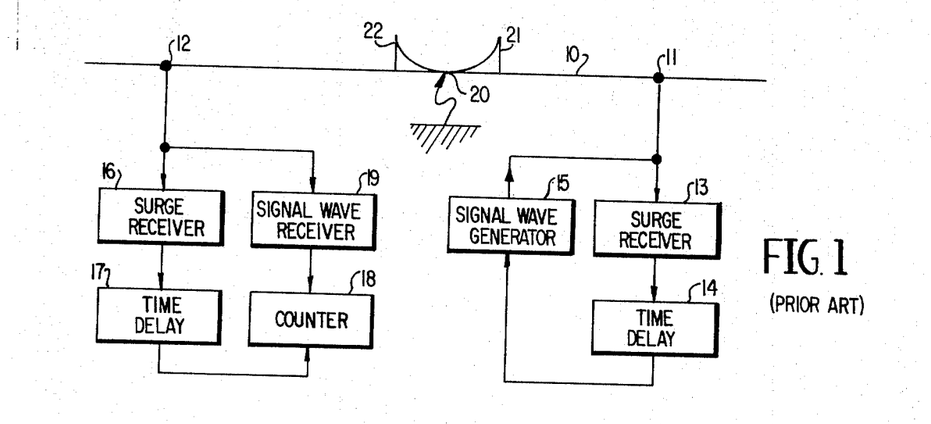
FIG. 1 shows a block diagram of a representative prior art fault localization apparatus for an electric power transmission line.

A fault localization apparatus for an electric power transmission line which is representative of the prior art is shown in FIG. 1. A section of an electric power transmission line to be inspected is shown with a reference numeral 10, and the same has a signal wave transmitting end 11 and a signal wave receiving end 12. The signal transmitting end 11 includes a surge receiver 13, a time delay device 14 for delaying the output signal from the receiver 13 for a predetermined time interval and a signal wave generator 15 which has an input connected to the output of the time delay device 14 and an output connected to the signal transmitting end 11. The signal receiving end 12 includes a surge receiver 16, a time delay device 17 for delaying the output signal from the receiver 16 for a predetermined time interval, a counter 18 which will start a counting operation by the output signal of the time delay 17 and a signal wave receiver 19 which has an input connected to the signal receiving end 12 and an output connected to the counter 18 for stopping the counting operation thereof.

Upon the occurrence of a fault on a point 20 of the section 10 to be inspected, an electrical surge 21 caused by the fault will progress to one end 11 of the section and be received by the surge receiver 13. The receiver 13 will then generate an output signal therefrom which will be applied to the signal wave generator 15 through the time delay device 14 to thereby start the signal generator 15. The other electrical surge 22 which will occur at the fault point 20 will progress to the surge receiver 16 and thereby cause an output signal to be applied through the delay device 17 to the counter 18 for starting a counting operation of the same. Now, the signal wave, which is generated by the signal wave generator 15, will progress from the sending end 11 to the receiving end 12 through the line section 10 and then be received by the signal wave receiver 19 for stopping the counting operation of the counter 18.

The time delay intervals in both time delay devices 14 and 17 are respectively selected to have substantially equal values such, for example, as 5 m sec., during which time the noisy surges to be reflected at the ends of the section 10 as well as at the fault point 20 will be reduced to a harmless amplitude for enabling clear receipt of the signal wave generated from the signal generator 15.

Assuming that the length of the section 10 is represented by 1 km. and that the distance between the fault point 20 and the signal transmitting end 11 is X km., then accordingly the distance between fault point 20 and signal receiving end 12 is $1 - X$ km.. Also, assume that each time delay interval of the time delay devices 14 and 17 are T sec., and that the propagation speed of a surge as well as a signal wave is respectively V km/sec.. The time during which the fault surge 21 will move from the fault point 20 to the signal transmitting end 11 can be represented by $X/V$ sec., and similarly the time during which the fault surge 22 will move from the fault point 20 to the signal receiving end 12 can be represented by $1 - X/(V)$ sec. Accordingly, the time interval from a fault generation to the signal reaching the receiving end 12 can be represented by:

$$(X/V) + T + (1/V) \text{ (sec.)} \qquad (2)$$

Thus, it is seen that the difference between the formulas (1) and (2) is represented by $2X/V$ sec., and that since the propagation speeds of the surge and signal waves have a value substantially equal to the propagation speed of light that accordingly the distance X between the fault point 20 and the signal transmitting end 11 can be obtained from the aforesaid result.

Generally, while somewhat satisfactory, certain problems have still existed in the prior art type fault localizers.

Thus, in the past, if the surge receiving sensitivity of the fault localizer was high, the same would be easily subjected to misoperation in response to a small surge, such as an inductive surge which may occur before the occurrence of a surge due to an actual fault. In the past, in order to avoid the above, the localizer has usually been made for receiving only surges having a predetermined level higher than that of the inductive lightening surge. However, in an electrical transmission line having a relatively low voltage level, such as in the order of 60 kv. to 70 kv., the amplitude of a direct stroke of lightning will sometimes be large enough to overcome that of an actual fault. Thus, it would be difficult to make an accurate fault localization of an actual fault point on an electric power transmission line.

SUMMARY OF THE INVENTION

Accordingly, it is an object of the present invention to provide a new and improved unique fault localization apparatus for an electric power transmission line which is capable of accurate fault localization without any influence due to an induction surge from lightning.

Another object of the present invention is to provide a new and improved unique fault localizer which can accurately localize an actual fault point on a power transmission line with a higher sensitivity than was heretofore possible.

One other object of the present invention is to provide a new and improved unique fault localizer which includes at least two counting devices operating cyclically to enable successive surges to be separately measured.

Briefly, in accordance with one aspect of the present invention, these and other objects are attained by the provision of a fault localization apparatus for an electric power transmission line in which first and second surge receivers are respectively located at a signal wave transmitting end and a signal wave receiving end of a section of the power transmission line to be inspected. The first surge receiver located at the signal wave receiving end functions to start the counting operation of a counter located at the receiving end when the receiver receives a surge coming along the section, and the receiver located at the signal wave transmitting end functions to energize a transmitter located at the signal transmitting end of the section to transmit a signal wave to the signal receiving end to cause the counting operation of the counter to stop when the surge receiver receives a surge coming along the section. A plurality of counter devices are provided at the signal receiving end for counting the distance between a fault point and the signal wave transmitting end of the section. A plurality of first counter control devices corresponding to the counter devices are provided at the signal receiving end for starting the counting operation of the counter devices according to a predetermined sequence every time the surge receiver receives a successive surge coming along the section. A plurality of second counter control devices corresponding to the counter devices are provided at the signal receiving end for stopping the counting operation of the corresponding counter devices according to a predetermined sequence. A signal wave receiver is provided at the signal wave receiving end for operating the second counter control devices every time a signal wave from the signal transmitting end is received. A relaying device is also provided at one end of the section to be inspected for detecting an internal fault of the section, for preventing any further surge receiving functions of the first surge receiver and for reading out the content of the counters.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

A detailed explanation of the general fault localization apparatus of the prior art has already been made in reference to FIG. 1 and a description of a preferred embodiment of the present invention will now be described in detail with reference to the remaining Figures, wherein like reference numerals designate identical, or corresponding parts throughout the several views.

Figure 2A:
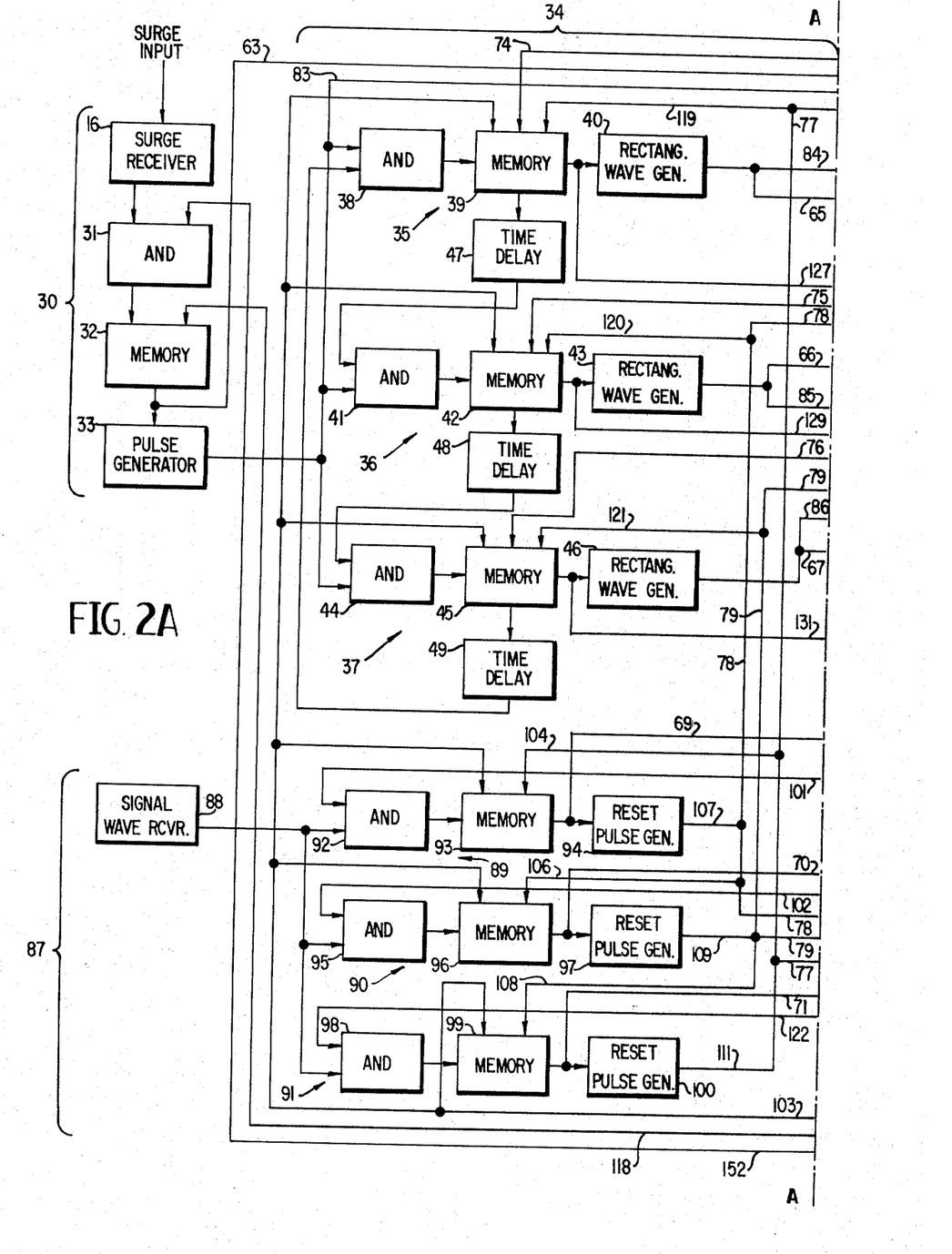
FIGS. 2A, 2B and 2C show block diagrams of a preferred embodiment of a fault localization apparatus located at the receiving signal end of a section of an electric power transmission line in accordance with the present invention; and, FIGS. 3A and 3B show waveforms with respect to time at various portions of FIGS. 2A, 2B and 2C.
Figure 2B:
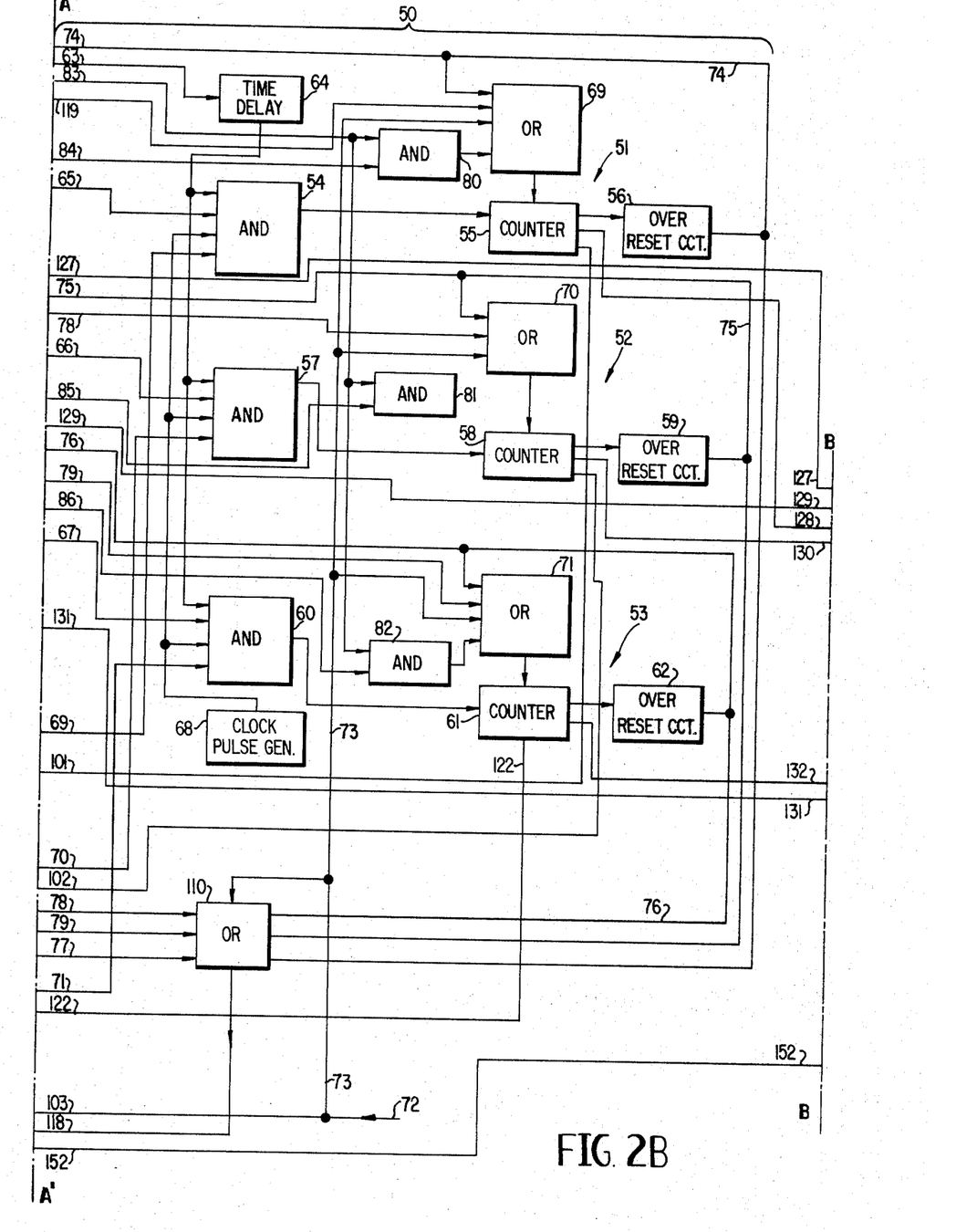
Figure 2C:
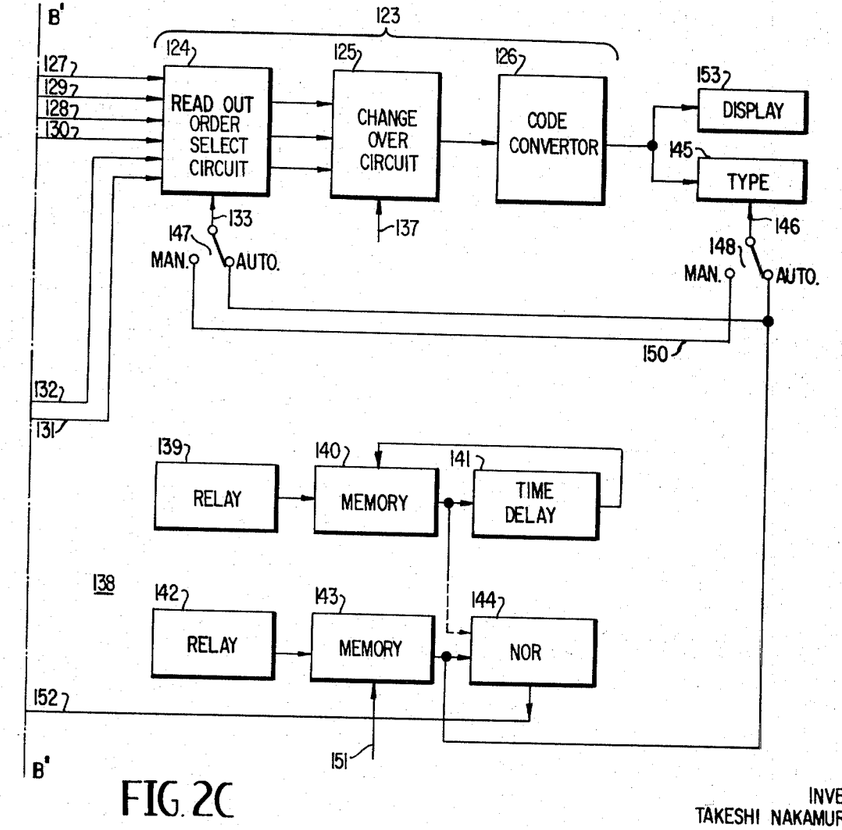

Referring now to FIGS. 2A, 2B and 2C, it should be understood that the fault localization apparatus of the present invention is provided at the signal receiving end 12 of the section 10 of FIG. 1, and includes a starting pulse generating circuit generally shown with a reference numeral 30. The circuit 30 includes a surge receiver 16, an AND gate 31 having a pair of inputs one of which is connected to the output of the surge receiver 16, a memory circuit 32 for storing the output signal from the AND gate 31 and a pulse generator 33 for generating a pulse 1 to 2 m. sec. in response to an output signal from the memory 32.

To effect the starting control of a counter circuit as described hereinafter, a circuit generally denoted by a reference numeral 34 is provided and the same includes three stages of counter control devices 35, 36 and 37. The first stage 35 of the counter control devices has a series combination of an AND gate 38, a memory circuit 39 and a rectangular wave generator 40. Similarly, the second stage 36 of the counter control devices has a series combination of an AND gate 41, a memory circuit 42 and a rectangular wave generator 43. The third stage 37 of the counter control devices also has a series combination of an AND gate 44, a memory circuit 45 and a rectangular generator 46. One of the inputs of each of the AND gates 38, 41 and 44 are commonly connected to the output of the pulse generator 33.

The other input of the AND gate 41 of the second stage 36 is connected to the output of the memory circuit 39 of the first stage 35 through a time delay circuit 47. Similarly, the other input of the AND gate 44 of the third stage 37 is connected to the output of the memory circuit 42 of the second stage 36 through a time delay circuit 48, and the other input of the AND gate 38 of the first stage 35 is connected to the output of the memory circuit 45 of the third stage 37 through a time delay circuit 49.

A counter circuit generally denoted by a reference numeral 50 is provided and the same includes three stages 51, 52 and 53, respectively, corresponding to each of the stages of the control circuit 34. The first stage 51 has a series combination of an AND gate 54, a counter 55 and an over resetting circuit 56. Similarly, the second stage 52 has a series combination of an AND gate 57, a counter 58 and an over resetting circuit 59. The third stage 53 also has an AND gate 60, a counter 61 and an over resetting circuit 62.

Each of the AND gates 54, 57 and 60 of each of the stages 51, 52 and 53 have four inputs. The first input of the AND gates 54, 57 and 60 is supplied a common signal from the output of the memory circuit 32 of the starting pulse generating circuit 30 through a conductor 63 and a time delay circuit 64. The second input of the AND gates 54, 57 and 60 is supplied a signal from the respective rectangular wave generators 40, 43 and 46 of the corresponding stage of the first control circuit 34 through respective conductors 65, 66 and 67. The third input of the AND gates 54, 57 and 60 is supplied common clock pulses from a clock pulse generator 68, and the fourth input of the AND gates 54, 57 and 60 is supplied a respective signal from the corresponding memory circuit, as described hereinafter, through respective conductors 69, 70 and 71.

In order to reset the counters 55, 58 and 61, OR gates 69, 70 and 71 are provided and each of the same has an output respectively connected to reset the corresponding counter and has four inputs. The first input of the OR gates 69, 70 and 71 is supplied a signal from the output of the corresponding over resetting circuit 56, 59 and 62 through respective conductors 74, 75 and 76. The second input of the OR gates 69, 70 and 71 is supplied a signal from a second counter control circuit, as described hereinafter, through respective conductors 119, 78 and 79. The third input of the OR gates 69, 70 and 71 is commonly connected to a manually reset pulse source 72 through a conductor 73, and the fourth input of the OR gates 69, 70 and 71 is respectively connected to the output of AND gates 80, 81 and 82 so as to enable a signal to be received therefrom.

One input of the AND gates 80, 81 and 82 is connected with each other and to the output of the pulse generator 33 through a conductor 83. The other input of the AND gate 80 is connected to the output of the rectangular wave generator 40 through a conductor 84. Similarly, the other input of the AND gate 81 is connected to the output of the rectangular wave generator 43 through a conductor 85, and the other input of the AND gate 82 is connected to the output of the rectangular wave generator 46 through a conductor 86.

A signal wave receiving and treating circuit generally denoted by a reference numeral 87 is provided, and the same includes a signal wave receiver 88 and a three-stage counter control circuit. The first stage 89 of the counter control circuit has a series combination of an AND gate 92, a memory circuit 93 and a reset pulse generator 94. Similarly, the second stage 90 of the counter control circuit has a series combination of an AND gate 95, a memory circuit 96 and a reset pulse generator 97, and the third stage 91 of the counter control circuit also has an AND gate 98, a memory circuit 99 and a reset pulse generator 100.

One input of the AND gates 92, 95 and 98 is connected with each other and to the output of the signal wave receiver 88. The other input of the AND gate 92 is connected to the output of the counter 55 to receive the signal therefrom through a conductor 101. The other input of the AND gate 95 is connected to the output of the counter 58 to receive the signal therefrom through a conductor 102, and the other input of the AND gate 98 is connected to the output of the counter 61 to receive the signal therefrom through a conductor 122.

Each of the memory circuits 93, 96 and 99 has a reset terminal for enabling a reset pulse from the pulse source 72 to be applied thereto through a conductor 103. The conductor 103 is also connected to a reset terminal provided within each of the memory circuits 39, 42 and 45 so as to enable these circuits to be reset when a reset pulse is applied thereto from the source 72.

The memory circuit 93 includes another reset terminal which is connected to the output of the reset pulse generator 100 through a conductor 104 which is also connected to another reset terminal, provided within the memory circuit 39, and the second input of the OR gate 69 through the conductor 77. The memory circuit 96 includes another reset terminal which is connected to the output of the reset pulse generator 94 through conductors 106, 98 and 107 which are also connected to the second input of the OR gate 70. The memory circuit 99 includes another reset terminal which is connected to the output of the reset pulse generator 97 through conductors 108 and 109 which are also connected to the second input of the OR gate 71 through a conductor 79.

The outputs of the reset pulse generators 94, 97 and 100 are connected to inputs of an OR gate 110 through respective conductors 107, 109 and 111 and 78, 79 and 77. The OR gate 110 also receives a reset pulse from the source 72 through the conductor 73 and further receives reset pulses from the over reset circuits 56, 59 and 62 through respective conductors 74, 75, and 76.

The output of the OR gate 110 is connected o a reset terminal provided within the memory circuit 32 of the starting pulse generating circuit 30 to enable the memory to be reset through a conductor 118.

Referring again to the circuits 34, 50 and 87, it should be understood that the fourth input of the AND gates 54, 57 and 60 is connected to the output of memory circuits 93, 96 and 99 through respective conductors 69, 70 and 71. The memory circuits 39, 42 and 45 each have three reset terminals, the first terminals of which are commonly connected to the manual reset source 72 through the conductor 103 and the second of which are connected to the output of the corresponding over reset circuit 56, 59 and 62 through respective conductors 74, 75 and 76. The third reset terminal of the memory 39 is connected to the output of the reset pulse generator 100 through conductors 119, 77 and 111. The third reset terminal of the memory 42 is connected to the output of the reset pulse generator 94 through the conductors 120, 78 and 107, and the third reset terminal of the memory 45 is connected to the output of the reset pulse generator 97 through the conductors 121, 79 and 109.

In order to read out the content of the counter circuit 50, a read out circuit 123 is provided and the same includes a series combination of a read out order selection circuit 124, a change over circuit 125 and a code converter circuit 126. The order selection circuit 124 has six inputs which are made into three two-input pairs and three outputs. One of the first pair of inputs is connected to the output of the memory circuit 39 through a conductor 127, and the other is connected to the output of the counter 55 through a conductor 128. One of the second pairs of inputs is connected to the output of the memory circuit 42 through a conductor 129, and the other is connected to the output of the counter 52 through a conductor 129. Similarly, one of the third pair of inputs is connected to the output of the memory circuit 45 through a conductor 131, and the other is connected to the output of the counter 61 through a conductor 132.

The read out order selection circuit 124 may comprise a combination of AND gates, and by way of example, when both output signals from the memory 39 and the counter 55 are simultaneously present on the conductors 127 and 128 and a read out signal is indicated from a conductor 133, then an output signal will be present at a first output 134 of the circuit 124. Similarly, when output signals from both the memory 42 and the counter 58 simultaneously exist on the conductors 129 and 130, then an output signal will be present at a second output 135 of the circuit 124 when a read out signal is applied over the conductor 133 to the circuit 124. Likewise, when output signals simultaneously exist on the conductors 131 and 132, a third read out signal will be present at the third output 136 of the circuit 124 when a read out signal is applied over the conductor 133 to the circuit 124.

The output signals from the circuit 124 will be forwarded according to the aforementioned sequence to the code converter 126 through the change over switching circuit 125 for enabling the same to be decoded into units of distance. The change over switching circuit 125 is employed for enabling a reading out of the information of a subsequent stage counter before the earlier one, if desired, when a switching signal is supplied to the circuit 125 through a conductor 137.

In order to effect an automobile reading out of the content in a counter, a relay circuit generally denoted by a reference numeral 138 is provided, and the same includes a high speed fault detecting relay 139 having no directional properties such, for example, as a voltage relay, a memory circuit 140 for committing the operation of the relay 139 to memory, and a time delay circuit 141 which allows the memory 140 to reset with a Predetermined time delay. The relay circuit 138 further includes a second relay 142 having properties for detecting an internal fault in a section of a power line being inspected such, for example, as a directional distance relay, a memory circuit 143 for committing the operation of the relay 142 to memory and an NOR gate 144 having a pair of inputs. The output signals from the memory circuits 140 and 143 are connected to the respective inputs of the NOR gate 144. The output signal from the memory 143 is also forwarded into the read out order selection circuit 124 and a typewriter 145 for enabling a typewriting out of the output of the code converter 126 through respective conductors 133 and 146 and change over switches 147 and 148. When switches 147 and 148 are in the position as shown, an automatic read out can be obtained, while if the switches are in an opposite position, a manual read out can be obtained in accordance with a signal on conductor 150. The output signal from the code converter 126 can also be indicated directly by a display 153.

The memory circuit 143 also has a reset terminal 151 for receiving a signal for effecting the resetting thereof. The output signal from the NOR gate 144 is connected through a conductor 152 to a reset terminal of the memory 32 in the starting pulse generating circuit 30 to thereby cause the memory 34 to reset.

Figure 3A:
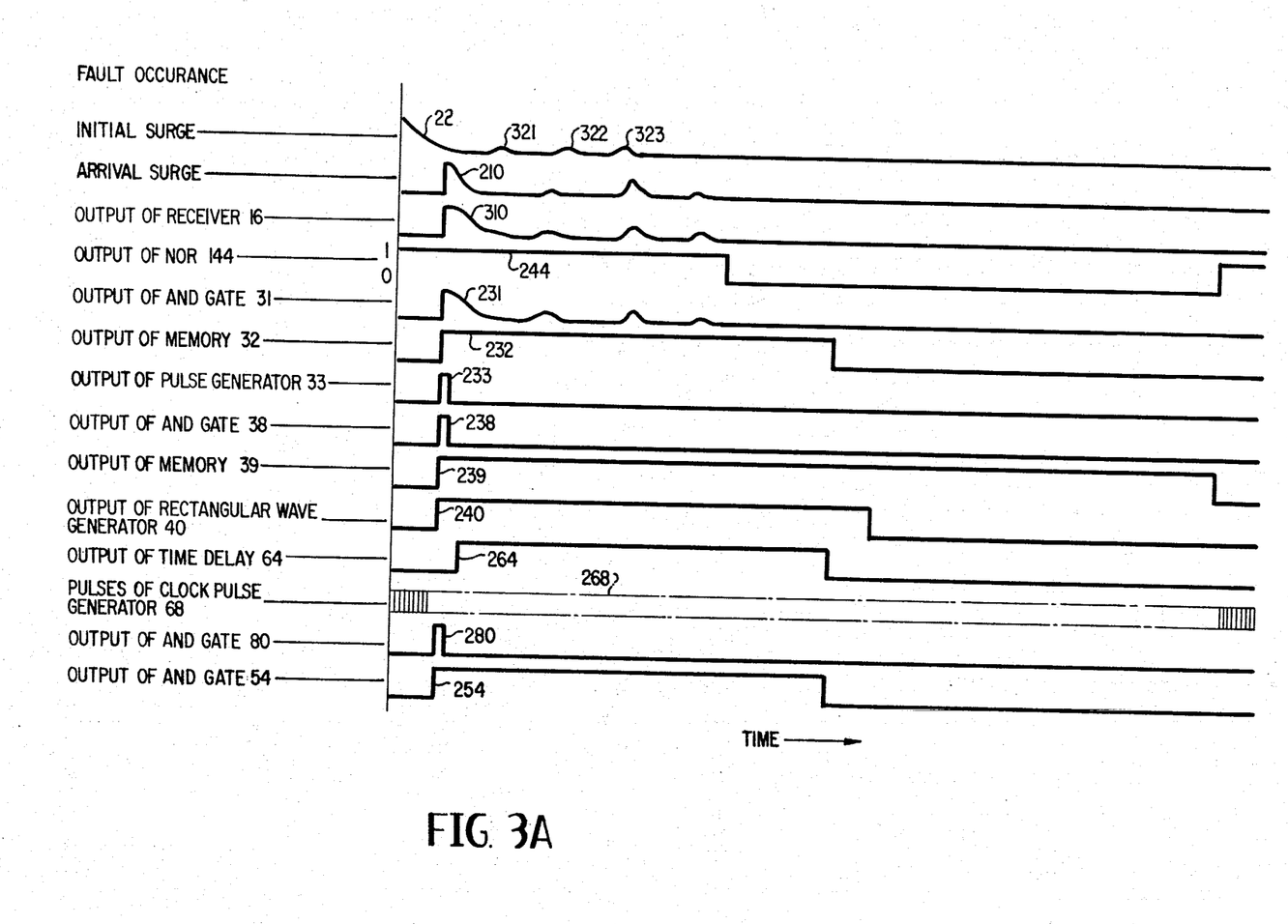

The operation of the embodiment set forth above will now be described in connection with FIGS. 3A and 3B.

Before a fault localization is made, a reset pulse is applied from the source 72 to the conductors 73 and 103, and at that time the relays 139 and 142 will be in a normal or non-operational state. Accordingly, the reset signal from the conductor 73 will be applied to the OR gates 69, 70, and 71 in the counter circuit 50 and the OR gate 110 in the signal wave receiving and treatment circuit 87, whereby the counters 55, 58 and 61 will be caused to reset. The memory circuits 39, 42 and 45 in the counter starting circuit 34 will also be caused to reset, as will the memory circuits 93, 96 and 99 in the signal wave receiving and treatment circuit 87. The NOR gate 144 will have an output signal therefrom because of the absence of an output signal from the memory circuits 140 and 143 in the relay circuit 138. Thus, an input signal is applied normally to one input of the AND gate 31 in the starting pulse generating circuit 30 from the output of the NOR gate 144 over the conductor 152.

As described above with reference to FIG. 1, if a fault occurs at a point 20 in the section 10 of an electric power line, electric surges 21 and 22 will be caused by the fault and proceed to the opposite ends of the section 10. The exemplary surge 22 occurring at the fault point 20 is shown in FIG. 3A.

The surge, which moves to the receiving end 12, is denoted by 210 and is delay from the initial surge 22 by a time necessary to transfer from the fault point 20 to the receiving end 12. The surge 210 is then received by the surge receiver 16 which will generate an output signal 310 therefrom. In this case, because an output signal 244 from the NOR gate 144 will exist simultaneously with the output signal 310 of the surge receiver 16 then the AND gate 31 will generate an output signal 231 therefrom. Thus, the memory 32 will generate an output signal 232 is response to the signal 231 and the AND gate 31 since the memory 32 has been resetting by the signal from the OR gate 110, whereby the pulse generator 33 will be caused to generate an output pulse 233 for a time interval of, for example, 1 to 2 m. sec.

As described above, the memory 39 in the first counter control circuit 34 has been resetting, while the other memory circuits 42 and 43 have been set. Accordingly, the AND gate 38 of the first stage 35 will generate an output signal 238 to set the memory 39 while the output signal from the time delay 49 is existing. The memory 39 will then generate an output signal 239 and thus hold the output signal of the AND gate 38. As a result of the output from the memory 39, the rectangular wave generator 40 will generate an elongated pulse 240. The width of the pulse 240 is selected so that one round of fault localization can be sufficiently made therein.

On the other hand, the output signal 232 from the memory 32 is somewhat delayed through the time delay circuit 64, as shown by a waveform 264, and is then applied to the first input of the AND gate 54 in the counter circuit 50. The output signal 233 from the pulse generator 33 is also applied to one input of the AND gate 80, and the other input of the AND gate 80 receives the output signal 240 from the rectangular wave generator 40 and will cause an output signal 280 to be applied to the fourth input of the OR gate 69. As a result thereof, the OR gate 69 will cause an output signal to cause the contents of the counter 55 to clear.

As described above, the first input of the AND gate 54 will receive the signal 264 from the time delay 64, the second input of the AND gate 54 will receive the signal 240 from the rectangular wave generator 40, the third input of the AND gate 54 will receive a signal 293 from the memory 93, which is in a "1" state in the absence of the receipt of a signal wave, and the fourth input of the AND gate 54 will receive clock pulses 268 from the clock pulse generator 68. Thus, the AND gate 54 will open as denoted by an output signal 254 to introduce clock pulses 368 into the counter 55.

It should be understood that the counter 55 is made such that a counting operation therein cannot occur for about 5 m. sec. during which time the reflected surges 321, 322 and 323, that may occur at various points along the section 10, such as the opposite ends thereof and the fault point will be reduced to a small value. Thus, the counter 55 will start its counting operation 5 m. sec. after the opening of the AND gate 54.

On the other hand, as described in connection with respect to FIG. 1, the fault surge 21 which has moved to the transmitting end 12 is received by the surge receiver 13 to start the signal wave generator 15 after the same time delay of 5 m. sec.

In this way, the signal wave 216 will arrive at the signal wave sending end 11 of the section 10 so as to be received by the signal wave receiver 88. The output signal 316 of the receiver 88 is then applied to one of the inputs of the AND gates 92, 95 and 98. Since the output signal of the counter 55 is applied only to the other input of the AND gate 92, accordingly, the AND gate 92 will be opened and cause the output signal from memory 93 to extinguish and thereby cause the fourth input signal 293 of the AND gate 54 to stop. As a result thereof, the counter 55 will stop its operation and the AND gate 92 will again close.

Figure 3B:
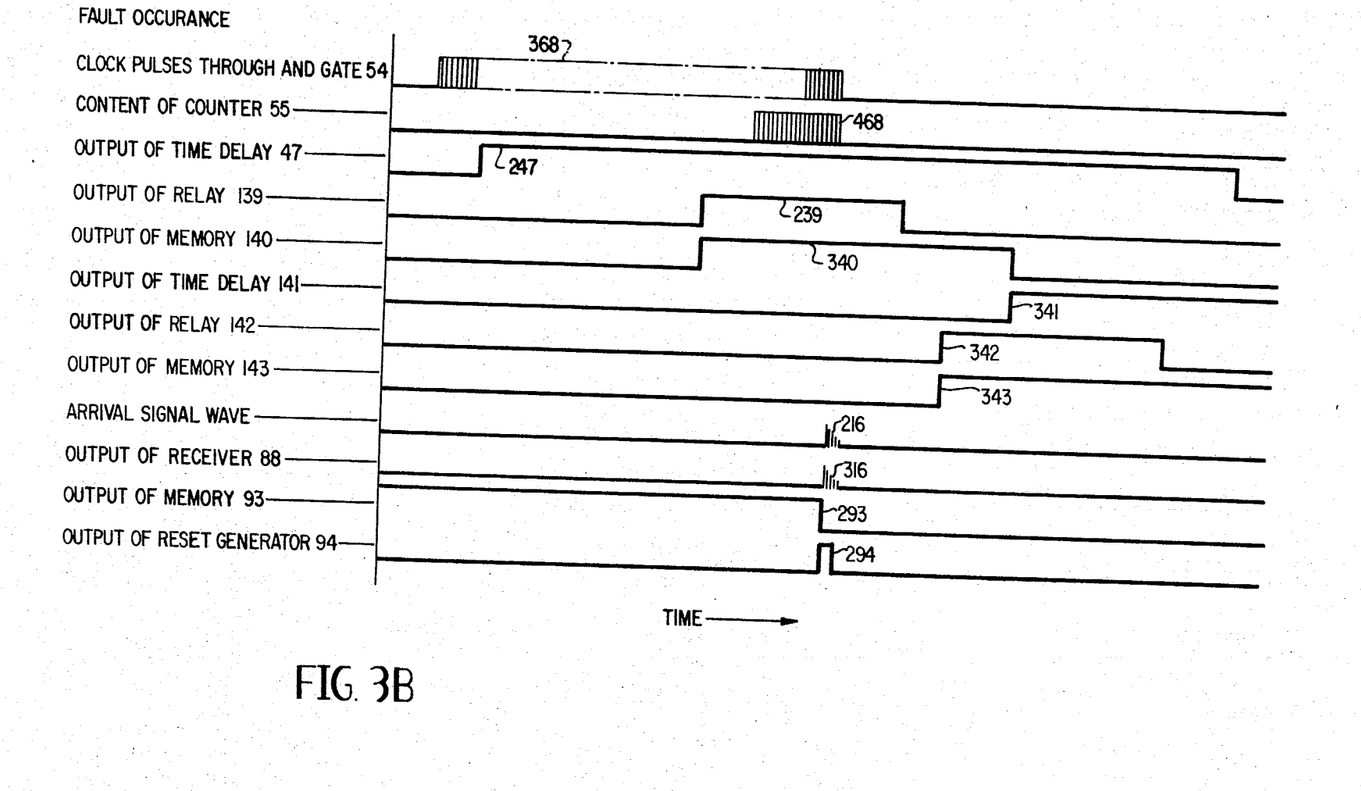

In this way, the content in the counter 55 will be at an amount denoted by 468 in FIG. 3B.

It should be understood that the reset pulse generator 94 is such that an output pulse 294 is generated therefrom for a time interval of 1 to 2 m. sec. when the output signal 293 from memory 93 ceases. The output 294 from the reset pulse generator 94 is applied to the OR gate 110 to reset the memory 32, applied to the second stage memory 42 to cause it to reset, and applied to the OR gate 70 to clear the content of the second stage counter 58.

The output signal 239 of the memory 39 is delayed through the time delay circuit 47, as shown by 247 in FIG. 2B, and applied to one input of the AND gate 41 of the second stage 36 of the counter starting control 34 to thereby cause the second stage AND gate 41 to prepare for the next localization. As described above, both the memory 42 of the second stage 36 and the second stage counter 58 have been reset by the pulse 294 from the reset pulse generator 94. Thus, the second stages 36 and 52 of the respective counter starting circuit 34 and the counter circuit 50 will be prepared for the next localization.

It should be understood that the high speed relay 139 will be operated in response to a fault after about 5 m. sec. after the fault occurrence, as denoted by 239, whereby at the same time the memory 140 will cause an output signal 340 to be generated therefrom. The output signal 340 from the memory 140 is applied to the time delay circuit 141 for causing a signal 341 to be generated therefrom to thereby reset the memory 140, and is applied to one input of the NOR gate 144 to extinguish the output signal 244 thereof and thereby lock and prevent the AND gate 31 of the starting pulse generating circuit 30 from a surge during a read out operation.

The internal fault detecting relay 142 will be operated in response to a fault after the operation of the high speed relay 139 and will cause an output signal 342 to be generated therefrom. The output signal 342 from the relay 142 is applied to the other input of the NOR gate 144 through the memory 143 which also causes the output signal 343 to be generated.

Thus, the AND gate 31 will remain closed by the output signal "0" from the NOR gate 144 during the read out operation. On the other hand, the output signal 343 from the memory 143 is forwarded to the read out order selection circuit 124 and the typewriter 145 through the switches 147 and 148. When the latter is positioned at the position "AUTO", the content of the counter 55 will be read out by the display 153 and/or the typewriter 145.

After a completion of a read out, a reset pulse is applied to the memory 143 for resetting the same. Thus, the locking signal 244 from the NOR gate 144 is removed from the other input of the AND gate 31, and then the starting generating circuit 30 will be prepared for the next localization.

As described above, if some induction lightning surges are present on the section 10 before the occurrence of an actual fault, a misoperation of the fault localizer or finder may occur.

In accordance with the present embodiment, one such surge will cause the first stage 35 in the counter starting control 34 to operate, and causes the counter 55 of the corresponding first stage 51 to operate for localization of the fault. However, the second stage 36 of the circuit 34 is subsequently prepared for the next localization by the output signal of the first stage memory 39 through the time delay 47. In this case, the second stage memory 42 is reset by a signal from the first stage reset pulse generator 94, and the content of the second stage counter 52 is cleared by the same signal. Similarly, the third stages 37 and 53 will be prepared for further and subsequent fault localizations by the operation of the second stages 36 and 52. The fault localizing operation of the third stages 36 and 52 causes the first stages 35 and 51 to prepare for still further and subsequent localizations. Thus, the fault localizer of the present invention and disclosed herein can automatically read out the most recent localization results by the read out signal from the protecting relay 142.

It should now be apparent that in accordance with the teachings of the present invention, since each stage 35, 36, 37, 51, 52, and 53 can be cyclically operated for subsequent fault localizations, it is not necessary to reduce the sensitivity of the fault localizer, and accordingly higher reliability can be achieved in locating an actual fault.

It should be understood that a failure in receiving a signal wave from the signal wave transmitting end may occur due to any failure of the signal wave generator. In this case, one of the counters 55, 58 and 61 in each stage may over count. However, the over reset circuits 56, 59 and 62 will respond to the over flow of the counters and reset the corresponding counters through the respective OR gates 69, 70 and 71. Moreover, the over reset signals from the over reset circuits 56, 59 and 62 are applied to the inputs of the OR gate 110 through the conductors 78, 79 and 77 to reset the memory 32 of the starting pulse generating circuit 50, thus enabling the cyclic operation of the fault localizer to be satisfactorily achieved.

Obviously, numerous modifications and variations of the present invention are possible in light of the above teachings. Thus, for example, where the signal wave transmission is of a wireless communication instead of the use of power transmission lines, the time delay set in the counters 55, 58 and 61, which is necessary to reduce the amplitude of reflected pulses, can be eliminated.

Moreover, it should further be apparent that the number of the stages 35, 36 and 37, as well as 51, 52 and 53 may be selected to any desired number of two or more.

It is therefore to be understood that within the scope of the appended claims, the invention may be practiced otherwise than as specifically described herein.

What is claimed as new and desired to be secured by Letters Patent of the United States is:

1. In a fault localization apparatus for locating any faults present along an electric power transmission line, said fault localizer comprising:
    a surge receiver located at one end of a section of said electric power transmission line wherein any of said faults are to be located for sequentially receiving surges due to any of said faults along said section and for generating output signals corresponding thereto,
    a starting pulse generating circuit connected to said surge receiver to be sequentially energized by the output signals from the surge receiver,
    at least two counter devices disposed in different stages each of said counter devices being capable of providing information relating to different ones of said faults along said section,
    at least two starting control devices disposed in different stages corresponding to said counter devices for starting the counting operation of the responsive counter devices, said starting control devices being connected to an output of said starting pulse generating circuit so as to be sequentially started in a predetermined order by the output signals therefrom in accordance with the sequential receipt of any of said faults by said surge receiver,
    a signal wave receiving device having outputs connected to said corresponding counter devices for sequentially stopping the counting operation of particular ones of said counter devices in response to the sequential receiving of corresponding surges from the other end of said section due to any of said faults along said section, and
    a read out device connected to the outputs of said counter devices for reading out the content thereof to thereby indicate the locations of any detected faults.

2. A fault localization apparatus according to claim 1, wherein,
    said starting control devices disposed in different stages are respectively linked to each other through time delay circuits, whereby the starting control devices will cyclically generate an output signal to operate said counter devices according to a predetermined sequence as well as according to a predetermined time delay every time a surge is received.

3. A fault localization apparatus according to claim 1, wherein
    said signal wave receiving device includes at least two counter stopping devices which are disposed in different stages corresponding to said counter devices disposed in different stages, and wherein said counter stopping devices function to stop the counting operation of the counter device disposed in the corresponding stage and at the same time clear the content of the counter device disposed in the next stage, as well as resetting the counter starting control device disposed in the next stage for preparation of receipt of the next surge.

4. A fault localization apparatus according to claim 1, wherein,
    said starting pulse generating circuit includes a memory circuit to hold the signal caused by the receiving of a surge for an interval of time from the receiving of a surge to the arrival of the signal wave, said held signal being supplied to said counter starting control devices in the form of a pulse.

5. A fault localization apparatus according to claim 3, wherein,
    said counter devices have outputs respectively connected to said counter stopping devices disposed in the corresponding stages.

6. A fault localization apparatus according to claim 1, wherein,
    said read out device includes a read out order selection device connected to the outputs of said counter devices and a protecting relay device for effecting an automatic read out operation when the relay device responds to an internal fault in the section of said electrical power transmission line, whereby the most recent content of said counter devices is read out.

7. A fault localization apparatus according to claim 6, wherein,
    said relay device includes a device for preventing the receipt of sequential surges upon the operation thereof.

8. A fault apparatus according to claim 1, wherein said counter devices include a device for resetting the respective corresponding counter device, in response to an over counting operation of the corresponding counter device which may occur in the absence of receipt of a signal wave.

* * * * *